United States Patent Office 2,972,600
Patented Feb. 21, 1961

---

2,972,600

SUBSTITUTED PHENOLS

Clinton A. Braidwood, Schenectady, N.Y., assignor to Schenectady Varnish Company, Inc., Schenectady, N.Y., a corporation of New York No Drawing. Filed Sept. 27, 1957, Ser. No. 686,573

24 Claims. (Cl. 260—59)

This invention relates to bromomethyl methylol phenols. At the present time various materials have been proposed for curing butyl rubber. Among such materials are the 2,6-dimethylol-4-alkyl phenols including the resols. These compounds have proven fairly successful but do not impart as high a tear resistance as would be desired in many instances to butyl rubber and also relatively large amounts of phenol must be added to the butyl rubber in order to obtain satisfactory results.

Accordingly, it is an object of the present invention to devise new phenols which are satisfactory for incorporation in butyl rubber.

An additional object is to devise phenols which impart improved tear resistance to butyl rubber.

A further object is to devise new phenols which can be incorporated in butyl rubber in smaller amounts than has previously been possible and still obtain outstanding results.

Another object of the invention is to prepare novel bromomethyl alkyl phenols.

Yet another object of the invention is to prepare novel bromomethyl resitols.

A still further object of the invention is to devise an improved method for preparing such bromomethyl phebromomethyl resitols.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the preparation of compositions containing bromomethyl phenols having the following formulae and also having a critical average amount of bromine:

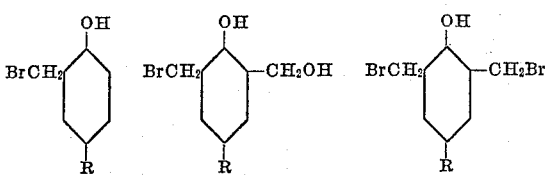

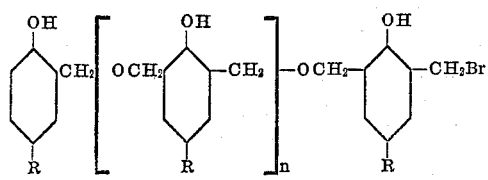

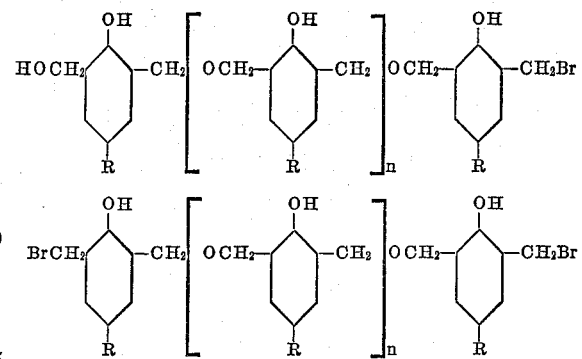

where R is an alkyl group of 4 to 20 carbon atoms and $n$ is a number averaging between 0 and 2. While the resitols in the above formulae are indicated as having methylene ether linkages,—$CH_2OCH_2$—, between the phenol rings, this is idealized, and, in fact, some of the phenol rings will be linked together directly by methylene linkages, —$CH_2$—. One or all of the above type compounds may be present in a composition coming within the instant invention.

It is critical that the percent bromine in the phenol be between the limits of 1% and 9% and preferably the percent bromine should be between 4% and 5%.

When hydrogen bromide is added to a phenol formaldehyde resin in order to determine the ether groups present, the amount of bromine addition is between approximately 25% and 50% of the weight of the resulting phenol. Such high additions of bromine are outside the scope of the present invention and, in fact, are inoperative in preparing a bromomethyl phenol which will satisfactorily process butyl rubber. Similarly, it is essential that the bromine be attached to the methylene side group and not be directly attached to the aromatic ring.

It should be noted that the chloromethyl phenols and resitols are in no way analogous to the bromo compounds of the instant invention since the chloro compounds tend to break down the butyl rubber and also impart aging and flexing characteristics to the butyl rubber which are much inferior to those obtained with the bromo compounds.

The products of the present invention can also be used to prepare molded products, e.g., cups.

The phenols from which the bromomethyl phenols are made have a hydrocarbon group in the position para to the phenolic hydroxyl. Such hydrocarbon group should be an alkyl group having 4 to 20 carbon atoms and preferably 6 to 10 carbon atoms. Examples of such phenols are p-tertiary butyl phenol; tt-octyl phenol, also known as alpha, alpha, gamma, gamma-tetramethyl butyl phenol; p-tertiary amyl phenol; p-dodecyl phenol; p-eicosyl phenol; p-tetradecyl phenol; p-n-hexyl phenol; p-tertiary hexyl phenol (3-methyl pentylphenol); and p-nonyl phenol (prepared by alkylation of mixed nonenes or tripropylene with phenol).

The compounds of the present invention can be prepared by (1) reacting hydrogen bromide either in gaseous or aqueous form with a mixture of the alkyl phenol and formaldehyde or by (2) reacting the hydrogen bromide in gaseous or aqueous form with the mono- or dimethylol derivative of the alkyl phenol or by (3) reacting the hydrogen bromide in gaseous or aqueous form with the resitol prepared by partial polymerization of the mono- or dimethylol derivative of the alkyl phenol. The resitol preferably has an average molecular weight corresponding to not more than the tetramer. It is to be understood, however, that the resitol can have an average molecular weight of a dimer or of a trimer. Examples of suitable methylol compounds which can be employed as starting materials are 2,6-dimethylol-4-t-butyl phenol; 2,6-dimethylol-4-t-amyl phenol; 2,6-dimethylol-4-tt-octyl phenol; 2,6-dimethylol-4-dodecyl phenol; 2,6-dimethylol eicosyl phenol; 2-methylol-4-tt-octyl phenol; 2-methylol-4-n-octyl phenol; 2-methylol-4-n-hexyl phenol; 2-methylol-4-t-butyl phenol and 2-methylol-4-eicosyl phenol.

Examples of suitable resitols are the tetramer of 4-tt-octyl phenol-formaldehyde condensation product, the dimer of 4-tt-octyl phenol-formaldehyde condensation product, the tetramer of 4-tertiary butyl-formaldehyde condensation product, the dimer of 4-tertiary butyl-formaldehyde condensation product, the trimer of 4-dodecyl phenol-formaldehyde condensation product, the tetramer of 4-eicosyl phenol-formaldehyde condensation product, etc. It is understood that when the terms "dimer, trimer and tetramer" are used, these are average molecular weights since in any resitol there are normally present some units slightly above the average and other units slightly below the average.

The bromination reaction usually goes to substantial completion. It normally is over 80%, and in some instances as much as 100%, of the bromine in the hydrobromic acid added to the reaction mixture ends up on the bromomethyl groups. It has been found that when the phenol, formaldehyde and hydrogen bromide are reacted simultaneously to form the bromomethyl group, the resulting compound can be utilized in much smaller quantities, e.g., about one half, than is the case when the hydrogen bromide is reacted either with the preformed methylol alkyl phenols or the preformed resitol. The formaldehyde is reacted with the phenol in an amount of about 0.5 to about 2.1 mols per mol of phenol. Excess formaldehyde can be used if desired, but such is merely wasteful. When hydrogen bromide is reacted with a methylol alkyl phenol, the reaction can take place either in the presence or absence of water. If desired, any water present can be removed either prior to or after the addition of hydrogen bromide by vacuum distillation. The resitols, i.e., the partial polymerization products of the methylol alkyl phenols, are usually dissolved in an inert solvent and are then treated with the hydrogen bromide. Typical examples of inert solvents which can be used are benzene, toluene, xylene and naphtha. For resitols made from the lower molecular weight alkyl phenols, generally an aromatic hydrocarbon solvent is employed, but for resitols from the higher molecular weight alkyl phenols, e.g., tertiary octyl phenol, there can be employed aliphatic hydrocarbons, e.g., n-heptane, n-hexane and gasoline, as well. When the alkyl phenol, formaldehyde and hydrogen bromide are reacted simultaneously, the reaction can be carried out either in the presence or absence of water or organic solvent. Organic solvents which can be utilized are the hydrocarbons previously indicated. Preferably, this reaction is carried out in the presence of water. The water can be supplied by using aqueous formaldehyde or aqueous hydrogen bromide. It is to be understood, however, that, if desired, formaldehyde can be supplied in the form of p-formaldehyde or trioxane, and the hydrogen bromide can be introduced as a gas.

In the present specification unless otherwise stated, all parts and percentages are by weight.

The temperature of reaction for forming the products of the invention is not particularly critical and normally temperatures between room temperature and 100° C. are employed. If the temperature is too high, there is a tendency for undesired removal of bromine from the compounds due to breakdown of the compounds caused by further polymerization.

*Example 1*

A resol (mono and dimethylol p-diisobutyl phenol) of p-diisobutyl phenol (also known as para tt-octyl phenol) was prepared by the following procedure:

2000 grams of para-diisobutyl phenol and 1060 grams of 15% sodium hydroxide were heated to 95° C. during agitation and held at 95° C. until all the para-diisobutyl phenol was in solution.

The aqueous sodium alkyl phenate was then cooled to 50° C. at which time 1260 grams of 37% formaldehyde was added, maintaining the temperature of 48 to 50° C.

After the formaldehyde had been added, the batch was held at 48 to 50° C. for 12 hours. The free formaldehyde was less than 1.5%.

The batch was then neutralized with dilute hydrochloric acid to a pH of 3.5, at a temperature of 40 to 45° C. After neutralization, the water was removed and, subsequently, the batch was water-washed several times to remove salts and excess hydrochloric acid.

This resol (mono and dimethylol para diisobutyl phenol) was then dehydrated (partially polymerized) by distillation at 27" vacuum, heating to 125 to 130° C. and holding at this temperature and vacuum pressure until a brittle resin was obtained (resitol stage).

The resin was removed from the flask and cooled. It averaged a tetramer in molecular weight.

Physical characteristics of the resin were:

Melting point (capillary) _____° C__ 50

Portions of this resin were treated as follows:

*Example 2*

| | Grams |
|---|---|
| Resin from Example 1 | 800 |
| Benzene | 800 |

The resin from Example 1 was dissolved in benzene at a temperature of 35° C. Agitation was continued until all of the resin was in solution. 40 grams of hydrogen bromide gas was sparged below the surface of the resin solution during vigorous agitation at temperatures from 25 to 30° C. Immediately after the hydrogen bromide gas addition to the resin solution, the benzene was recovered by 27" vacuum distillation with heating to 95° C. The bromomethyl and methylol-octyl-phenol polymer mixture obtained was removed from the flask and cooled.

Physical characteristics of the treated resin were:

Melt point (capillary) _____° C__ 43
Percent combined bromine by analysis _____ 4.2

*Example 3*

| | Grams |
|---|---|
| Resin from Example 1 | 680 |
| Benzene | 680 |

The resin from Example 1 was dissolved in benzene. To this solution, 32 grams of hydrogen bromide gas were added through a sparge below the surface of the solution at a temperature of 22 to 30° C. After the hydrogen bromide gas addition, agitation was continued several hours at room temperature. The benzene was removed by heating to 85° C. under 27" vacuum distillation. The resin was then removed from the flask and cooled.

Physical characteristics of the treated resin were:

Melting point (capillary) _____° C__ 50
Percent combined bromine by analysis _____ 4.2

*Example 4*

A condensate (resol) of one mol octyl phenol to 1.5 mols of 37% formaldehyde was prepared using the following reagents:

| | Grams |
|---|---|
| Para-diisobutyl phenol | 2000 |
| 15% sodium hydroxide | 1060 |
| 37% formaldehyde | 1260 |

The dilute (15%) sodium hydroxide solution was added to the para-diisobutyl phenol and heated to 95° C.

This was then cooled to a temperature of from 45 to 50° C. and the formaldehyde added during agitation, and cooling, maintaining a temperature of 40 to 45° C. The temperature was maintained for approximately 10 hours at which time a free formaldehyde of less than 1.5% was obtained.

The batch was then neutralized with dilute hydrochloric acid to a pH of 3.5 and, subsequently, water-washed several times to remove sodium chloride and excess hydrochloric acid. Water of neutralization and water from washes were removed by decantation. Each wash was vigorously agitated. The resol at this stage contained approximately 10 to 15% of mechanical water.

The condensate (resol) of the mono and dimethylol para-diisobutyl phenol was used in Examples 5 and 6.

Example 5

1178 grams of the resol from Example 4 were dehydrated under 26 to 27" vacuum, keeping the temperature below 50° C. in order to remove the mechanical water and, also, to minimize the formation of the dimers of octyl phenol methylols. When the batch was clear (free of water) at 40° C., under 27" vacuum, 50 grams of hydrogen bromide gas were sparged under the surface of the resol during vigorous agitation at atmospheric pressure. The temperature of the batch was increased to 52° C., and water of reaction was noted from the hydrogen bromide and the hydroxyl on the methylol groups on the para-diisobutyl phenol according to the equation: $HBr + HOCH_2-\rightarrow HOH + BrCH_2-$. A portion of the methylols on the para-diisobutyl phenols was changed to 2-bromomethyl, 4-diisobutyl phenol and/or 2,6-dibromomethyl, 4-diisobutyl phenol. The resol, immediately after the hydrogen bromide addition, was partially polymerized by heating to 100° C. under 27" vacuum distillation. The resulting resin was removed from the flask and cooled.

Physical characteristics of the resin were as follows:

Melt point (capillary) _____ ° C__ 50
Percent combined bromine by analysis _____ 4.3

Example 6

A second portion of the resol (mono- and dimethylol para-diisobutyl phenol from Example 4) was treated in the following manner:

55 grams of hydrogen bromide gas were sparged below the surface of 1223 grams of the resol (containing approximately 15% of mechanical water) during vigorous agitation. The temperature of the resol was 27° C. before the addition of the hydrogen bromide gas and increased to 40° C. at the end of this addition. Fifteen minutes after the hydrogen bromide gas addition, the mono and dimethylol para-diisobutyl phenol (with a portion of its methylols changed to 2-bromomethyl, 4-diisobutyl phenol and/or 2,6-dibromomethyl, 4-diisobutyl phenol) was partially polymerized to a brittle resin, by dehydration under 27" vacuum distillation with heating to 95° C. The resin was removed from the flask and cooled.

Physical characteristics of the resin were as follows:

Melt point (capillary) _____ ° C__ 65.5
Percent combined bromine by analysis _____ 4.6

Example 7

A condensate (resol) of two mols of 37% formaldehyde and one mol of para-diisobutyl phenol was prepared in a similar manner to Example 4, using 15% aqueous sodium hydroxide as catalyst. The temperature was maintained between 40 to 45° C. until a free formaldehyde of less than 4% was obtained at which time the condensate was neutralized with dilute hydrochloric acid to a pH of 3.5. The batch was then water-washed several times to remove salt and excess hydrochloric acid.

Example 8

1300 grams of the dimethylol para-diisobutyl phenol (resol from Example 7) containing approximately 15% mechanical water was dehydrated by heating to 42° C. under 27" vacuum until the resol was clear. At this point, 200 grams of benzene was added to reduce the viscosity of the resol; 62 grams of hydrogen bromide gas were then sparged below the surface of the benzene solution of the dimethylol para-diisobutyl phenol. The temperature of the batch before addition of hydrogen bromide gas was 40° C. and after the addition, the temperature was 55° C.

After the hydrogen bromide gas addition, agitation was continued for one hour. The dimethylol para-diisobutyl phenol (with a portion of the methylols now changed to 2-bromomethyl, 4-diisobutyl, 6-methylol phenol and/or 2,6-dibromomethyl, 4-diisobutyl phenol) was dehydrated (distilled) under a vacuum of 27" until the batch was relatively clear at a temperature of 80° C. The resin was removed from the flask and cooled.

Physical characteristics of the resin were as follows:

Melt point (capillary) _____ ° C__ 30
Percent combined bromine by analysis _____ 5.8

Example 9

To a second portion of the resol of Example 7 (1300 grams of dimethylol para-diisobutyl phenol which contained approximately 15% mechanical water) was added 165 grams of 40% hydrobromic acid. The temperature of the batch before the addition of the 40% hydrobromic acid was 27° C., and this was raised to 28° C. after the addition. The agitation of the batch was continued for two hours, the temperature remaining at 30° C. 300 grams of benzene were then added to aid removal of the water. The dimethylol para-diisobutyl phenol, some of the methylols of which were now changed to bromomethyl groups, was then dehydrated (distilled) at 27" vacuum, heating to 80° C. The resin was removed from the flask and cooled.

Physical characteristics of the resin were as follows:

Melt point (capillary) _____ ° C__ 40
Percent combined bromine by analysis _____ 6

Example 10

| | Grams |
|---|---|
| Para-tertiary butyl phenol | 1000 |
| Formaldehyde | 1080 |
| 18% sodium hydroxide (aqueous) | 360 |

A resol (dimethylol para-tertiary butyl phenol) was prepared by the following method:

The para-tertiary butyl phenol and sodium hydroxide solution were heated to 90° C. during agitation and held at 90° C. until all para-tertiary butyl phenol was in solution.

The batch was then cooled to 48 to 50° C. and the formaldehyde added, maintaining the temperature of 48 to 50° C. during the entire addition. After the formaldehyde addition, the temperature of the batch was maintained at 46 to 48° C. for approximately 12 hours to a free formaldehyde of less than 4%.

The batch was then neutralized with dilute hydrochloric acid to a pH of 3.5. Water was removed after neutralization. The batch (resol of dimethylol para-tertiary butyl phenol) was then water-washed several times to remove the salt and excess hydrochloric acid.

500 grams of dimethylol para-tertiary butyl phenol (resol) were heated to 55° C. during agitation under 27" vacuum distillation until the resol was free from mechanical water which was noted by the clarity of the resol. The resol (dimethylol para-tertiary butyl phenol) weighed 404 grams. To this 200 grams of toluene were added. During continued agitation, 28 grams of hydrogen bromide gas were added below the surface of the batch through a sparge. The temperature of the batch increased to 55° C. The dimethylol para-tertiary butyl phenol with a portion of the methylols now changed to bromomethyl groups was further dehydrated under 27" vacuum distillation with heating to 60° C. The batch was removed from the flask and cooled.

The resitol (semi-brittle) had the following physical characteristics:

Melt point (capillary) _____° C__ 48
Percent combined bromine by analysis _____ 7.9

The resitol was approximately a tetramer.

*Example 11*

A resol was prepared from para-tertiary amyl phenol as follows:

To 1000 grams of para-tertiary amyl phenol, 362 grams of an 18% solution of sodium hydroxide were added. Under controlled conditions (as in Example 1) 790 grams of 37% aqueous formaldehyde were added. The procedures for time, temperature, free formaldehyde, neutralization, washing, etc. were followed as in Example 1.

The mono and dimethylol para-tertiary amyl phenol (resol) was then split into two parts and used in Examples 12 and 13.

*Example 12*

To 700 grams of the mono and dimethylol para-tertiary amyl phenol of Example 11 were added 200 grams of toluene. During agitation at a temperature of 38° C., 38 grams of hydrogen bromide gas were added through a sparge below the surface of the solution during vigorous agitation. Immediately after the hydrogen bromide gas addition, the batch was distilled by heating to 100° C. under 27" vacuum during agitation. The batch was removed from the flask and cooled.

The physical characteristics were as follows:

Melt point (capillary) _____° C__ 56
Percent combined bromine by analysis _____ 7.6

*Example 13*

700 grams of the mono and dimethylol para-tertiary amyl phenol of Example 11 was dehydrated, heating to 50° C. under 27" vacuum distillation during agitation. When the resol was clear (free from mechanical water), 200 grams of toluene were added and during vigorous agitation, 30 grams of hydrogen bromide gas were introduced through a sparge below the surface of the solution. The temperature of the batch before the hydrogen bromide addition was 40° C. and after the addition, the temperature was 62° C. Immediately after the hydrogen bromide gas addition, agitation was maintained and the batch was distilled by heating to 95° C. under 27" vacuum. The batch was removed from the flask and cooled.

Physical characteristics were as follows:

Melt point (capillary) _____° C__ 50
Percent combined bromine by analysis _____ 5

*Example 14*

To 412 grams of para-diisobutyl phenol, 400 grams of toluene were added.

When all of the para-diisobutyl phenol had dissolved during agitation, 243 grams of 37% aqueous formaldehyde were added.

At a temperature of 22° C. and during vigorous agitation, 90 grams of hydrogen bromide gas were added through a sparge below the surface of the liquid level. The temperature of the batch was 58° C. at the end of the hydrogen bromide gas addition.

The reaction mixture was then heated to a reflux temperature of 93° C. and held at reflux for 3 hours during agitation. At the end of the 3-hour reflux period, the free formaldehyde of the aqueous layer was 16%.

The batch was then distilled under vacuum of 27", heating to 100° C. The batch was removed from the flask and cooled. 185 ml. of water were recovered from the distillation. The water contained 10.2% free formaldehyde.

Physical characteristics were as follows:

Melt point (capillary) _____° C__ 60
Percent combined bromine by analysis _____ 9

The molecular weight averaged for a tetramer.

*Example 15*

Another batch was prepared, using the same procedure and weight load of para-diisobutyl phenol, toluene and formaldehyde as in Example 14. When the para-diisobutyl phenol and toluene were in solution, the formaldehyde was introduced.

During vigorous agitation, 60 grams of hydrogen bromide gas were added below the liquid level of the batch through a sparge. The temperature before the hydrogen bromide gas addition was 22° C. and at the completion of the hydrogen bromide gas addition, it was 45° C.

Agitation was continued for 3 hours at 93° C. The free formaldehyde was 7% on the aqueous layer at the end of this 3-hour period.

The batch was then distilled, heating to 87° C. under 27" vacuum. The batch was removed from the flask and cooled.

The resin polymer (consisting before distillation of bromomethyl and methylol para-diisobutyl phenol) had condensed or polymerized to a point where a tetramer was formed.

Physical characteristics were as follows:

Melt point (capillary) _____°C__ 56
Percent combined bromine by analysis _____ 4.55

The compounds of the present invention have proven outstanding in the processing of butyl rubber and in the ultimate curing thereof. In this respect they have proven superior to the corresponding methylol alkyl phenols and resitols. Thus, the cured butyl rubber has increased tear resistance as compared to the non-brominated resols and resitols and, in addition, it has surprisingly been found that much less of the brominated resin need be employed to effect the optimum ultimate cure and other optimum physical properties in the butyl rubber.

I claim:

1. A composition of matter obtained by brominating a phenolic material selected from the group consisting of 2-hydroxymethyl 4-alkyl phenols, 2,6-dihydroxymethyl 4-alkyl phenols, resitols of such hydroxymethyl 4-alkyl phenols wherein the resitol has an average of up to 4 phenol units, and a mixture of a 4-alkyl phenol with 0.5 to 2.1 mols of formaldehyde per mol of said phenol said alkyl group containing 4 to 20 carbon atoms and the average bromine content of the brominated material being from about 1 to about 9%, said bromine being the only additive to said phenolic material.

2. A composition according to claim 1 wherein the bromine content of the material is about 4 to 5%.

3. Bromomethyl 4-alkyl phenol formaldehyde resols wherein the alkyl group has 4 to 20 carbon atoms and the bromine content of the resol is about 1 to 9%, said bromine being the only additive to said phenolic material, and said bromomethyl 4-alkyl phenol formaldehyde resol having been obtained by brominating a 4-alkyl formaldehyde resol.

4. Bromomethyl 4-alkyl phenol formaldehyde resols wherein the alkyl group has 4 to 20 carbon atoms and the bromine content of the resol is about 4 to 5%, said bromine being the only additive to said phenolic material, and said bromomethyl 4-alkyl phenol formaldehyde resol having been obtained by brominating a 4-alkyl formaldheyde resol.

5. Bromomethyl 4-alkyl phenol formaldehyde resitols wherein the alkyl group has 4 to 20 carbon atoms and the bromine content of the resitol is about 1 to 9% having up to an average of 4 phenol units in the molecule, said bromine being the only additive to said phenolic material, and said bromomethyl 4-alkyl phenol formaldehyde resitol having been obtained by brominating a 4-alkyl formaldehyde resitol.

6. Bromomethyl 4-alkyl phenol formaldehyde resitols wherein the alkyl group has 4 to 20 carbon atoms and the bromine content of the resitol is about 4 to 5% having up to an average of 4 phenol units in the molecule, said bromine being the only additive to said phenolic material, and said bromomethyl 4-alkyl phenol formaldehyde resitol having been obtained by brominating a 4-alkyl formaldehyde resitol.

7. A composition according to claim 1 wherein the alkyl group contains 8 carbon atoms.

8. A composition according to claim 7 wherein the alkyl group is the diisobutyl group.

9. A composition according to claim 8 wherein the bromomethyl compound has an average of about 4 to 5% of bromine.

10. A composition according to claim 1 wherein the bromine content of the material is about 4 to 5% and the alkyl group contains 8 carbon atoms.

11. A composition according to claim 10 wherein the bromomethyl material is a formaldehyde resitol.

12. A composition according to claim 1 wherein the alkyl group is the tertiary butyl group.

13. A composition according to claim 12 wherein the material has an average of about 4 to 5% of bromine.

14. A composition according to claim 1 wherein the alkyl group is a butyl group.

15. A composition according to claim 1 weherin the alkyl group is an amyl group.

16. A process of preparing a brominated alkyl phenol which comprises reacting a 4-alkyl phenol wherein the alkyl group has 4 to 20 carbon atoms with formaldehyde and hydrogen bromide in an amount sufficient to form a bromomethyl alkyl phenol compound having 1 to 9% of bromine.

17. A process according to claim 16 wherein the amount of hydrogen bromide added is such as to form a bromomethyl alkyl phenol compound having 4 to 5% of bromine in the molecule.

18. A process according to claim 16 carried out in aqueous medium.

19. A process according to claim 16 wherein the alkyl phenol is a 4-octyl phenol.

20. A process according to claim 19 wherein the octyl phenol is diisobutyl phenol.

21. A process according to claim 16 wherein the alkyl phenol is a 4-butyl phenol.

22. A process according to claim 21 wherein the alkyl phenol is 4-tertiary butyl phenol.

23. A process according to claim 16 wherein the alkyl phenol is a 4-amyl phenol.

24. The process of preparing a bromomethyl 4-alkyl phenol resitol having from 4 to 20 carbon atoms in the alkyl group and in which the resitol has up to an average of 4 phenolic nuceli per molecule comprising reacting 1 mol of the corresponding alkyl phenol with 0.5 to 2.1 mols of formaldehyde and hydrogen bromide, the hydrogen bromide being present in an amount sufficient to form a resitol having 1 to 9% of bromine and stopping the reaction before the resitol goes beyond the tetramer stage.

References Cited in the file of this patent
UNITED STATES PATENTS

| | | |
|---|---|---|
| 2,027,988 | Landt | Jan. 14, 1936 |
| 2,165,956 | Brunner | July 11, 1939 |
| 2,546,946 | Hartough et al. | Mar. 27, 1951 |

FOREIGN PATENTS

| | | |
|---|---|---|
| 690,781 | Germany | May 7, 1940 |

OTHER REFERENCES

"The Chemistry of Phenolic Resins," J. Wiley & Sons N.Y. (1956).

Zinke et al.: Berichtle der Deutschen Chemischen Gesellschaft, vol. 75, pp. 151–155 (1942).

Notice of Adverse Decision in Interference

In Interference No. 93,624 involving Patent No. 2,972,600, C. A. Braidwood, Substituted phenols, final judgment adverse to the patentee was rendered Feb. 7, 1964, as to claims 1, 2, 3, 4, 5, 6, 7, 10, 11, 12, 13, 14, 16, 17, 18, 19, 21, 22 and 24.

[*Official Gazette December 22, 1964.*]